United States Patent
Adam et al.

(10) Patent No.: US 7,953,091 B2
(45) Date of Patent: May 31, 2011

(54) METHOD FOR TRANSMITTING A PLURALITY OF IDENTIFIER FIELDS IN A PACKET SWITCH NETWORK

(75) Inventors: Yann Adam, Treguier (FR); Rémi Clavier, Pleumeur Bodou (FR); Thierry Marcot, Lannion (FR)

(73) Assignee: France Telecom, Paris (FR)

( * ) Notice: Subject to any disclaimer, the term of this patent is extended or adjusted under 35 U.S.C. 154(b) by 184 days.

(21) Appl. No.: 12/298,844

(22) PCT Filed: Apr. 27, 2007

(86) PCT No.: PCT/FR2007/051184
§ 371 (c)(1),
(2), (4) Date: Oct. 28, 2008

(87) PCT Pub. No.: WO2007/125259
PCT Pub. Date: Nov. 8, 2007

(65) Prior Publication Data
US 2009/0122799 A1    May 14, 2009

(30) Foreign Application Priority Data
Apr. 28, 2006   (FR) ...................................... 06 51536

(51) Int. Cl.
*H04L 12/28* (2006.01)
(52) U.S. Cl. ........................................ 370/392; 709/203
(58) Field of Classification Search ........................ None
See application file for complete search history.

(56) References Cited

U.S. PATENT DOCUMENTS

| | | | |
|---|---|---|---|
| 2002/0080872 A1* | 6/2002 | Takamizawa | 375/240 |
| 2004/0095947 A1* | 5/2004 | Luciani et al. | 370/410 |
| 2005/0080912 A1 | 4/2005 | Finn | |
| 2006/0007925 A1 | 1/2006 | Wright et al. | |
| 2006/0239296 A1* | 10/2006 | Jinzaki et al. | 370/468 |

FOREIGN PATENT DOCUMENTS

| | | |
|---|---|---|
| WO | 0229991 | 4/2002 |
| WO | 03001748 | 1/2003 |
| WO | 2005032063 | 4/2005 |

OTHER PUBLICATIONS

International Search Report and Written Opinion dated Sep. 17, 2007 for corresponding International Application No. PCT/FR2007/051184 filed Apr. 27, 2007.

* cited by examiner

*Primary Examiner* — Phirin Sam
(74) *Attorney, Agent, or Firm* — David D. Brush; Westman, Champlin & Kelly, P.A.

(57) ABSTRACT

A method is provided for transmitting a sequence of N virtual network identifier fields from a client entity to a server entity, the server entity belonging to a packet switching transport network. The method includes, at the level of the client entity, choosing a coder from among a plurality of coders, coding the sequence of N identifier fields with the aid of the chosen coder, and writing the coded sequence and the associated coding parameters in a packet. At the level of the server entity, on receipt of a packet, the method includes reading the coding parameters in the packet received, so as to identify at least the coder used and in decoding the coded sequence received with the aid of a decoder corresponding to the identified coder.

13 Claims, 4 Drawing Sheets

METHOD FOR TRANSMITTING A PLURALITY OF IDENTIFIER FIELDS IN A PACKET SWITCH NETWORK

CROSS-REFERENCE TO RELATED APPLICATIONS

This Application is a Section 371 National Stage Application of International Application No. PCT/FR2007/051184, filed Apr. 27, 2007 and published as WO 2007/125259 on Nov. 8, 2007, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of telecommunications, and more particularly packet switching transport networks.

BACKGROUND OF THE DISCLOSURE

Ethernet technology based on packet switching is increasingly being used by telecommunication operators. It intervenes at the level of the transport layer of the OSI model, the acronym standing for "Open Systems Interconnection", and replaces transmission in synchronous mode carried out, for example, by way of the SDH protocol, the acronym standing for "Synchronous Digital Hierarchy".

It is for example implemented by an operator for collecting residential streams in a collection network. Such a network comprises a plurality of access points, which are in particular responsible for collecting the various types of streams which originate from subscribers. When the link is a telephone copper wire pair, the access point is a digital multiplexer of client lines, known by the term DSLAM. DSLAM is the acronym standing for "Digital Subscriber Line Access Multiplexer".

Ethernet VLAN technology allows an operator to define, on the basis of a physical telecommunications network, several virtual networks, so as to differentiate the services that the operator puts in place for their clients. A virtual or Ethernet VLAN network, the acronym standing for Virtual Local Area Network, connects the terminals involved in the implementation of a particular service.

To facilitate the processing of the various types of streams which pass through the access point, the operator puts in place virtual networks which pertain, for example, to:
- a voice-over-IP related service, IP being the acronym standing for "Internet Protocol";
- a television-channels-over-IP service;
- a VOD service, the acronym standing for "Video On Demand";
- an Internet access service;
- a service offering a first bundle of satellite television channels;
- a service offering a second satellite television bundle;
- the traffic for managing the collection network proper.

A first advantage of Ethernet VLANs is that the items of equipment connected by a first Ethernet VLAN are not directly accessible at the Ethernet level from an item of equipment belonging to a second Ethernet VLAN. One speaks of leakproofness between the virtual networks. This leakproofness facilitates the processing of the data streams.

A second advantage of virtual networks resides in the fact that they allow dynamic configuration of the physical transport network so as to accommodate the variable requirements of clients over time. For example, the television-channels-over-IP service may require dynamic bandwidth allocation on a specific day from 20H45 to 23H00 during retransmission of the football world cup final. In this case, an additional Ethernet VLAN may be put in place during this period by the operator to allocate the additional bandwidth. A bank may also ask to benefit from dynamic bandwidth allocation every night to convey data between its headquarters and its branches.

An Ethernet VLAN is identified in the network on the basis of Ethernet level information, more precisely by an identifier field. The IEEE 802.1Q standard defines an identifier field VLAN-ID for representing the serial number of an Ethernet VLAN of Ethernet type. This field is coded on 12 bits and therefore allows 4096 values of Ethernet VLAN serial numbers. For its part, the IEEE 802.1ah standard defines an identifier field I-TAG coded on 20 bits.

When it is decided, for example at the level of a transmission network management system or NMS, the acronym standing for "Network Management System", to create a new service or to establish new connections within the network, a request is emitted by the NMS, via a management network, destined for entities of the network, called client entities. This request specifies the Ethernet VLAN involved with the aid of its identifier field. The client entities of the transport network which receive the request emitted by the NMS are, for example, routers which then pass on the request to server entities of the transport network, such as access points, so as to establish the requested end-to-end connection.

Increasingly often today, an operator uses Ethernet technology and in particular VLANs to dynamically configure his transport network.

The quantity of information relating to the VLAN identifier fields to be conveyed between the NMS and the client entities of the transport network is constantly growing. This is because the creation of a new service may require the specification of several hundred VLANs. The putting in place of an interconnection of metropolitan networks based on Ethernet technology by a transport network or an aggregation of network services in a lower layer, for example an aggregation of Ethernet VLAN virtual networks in an SDH transport layer, may be mentioned for example.

Now, current protocols for managing VLANs allow the specification of only a single VLAN serial number per request. Consequently the creation of a new service may require the sequential dispatching of several hundred requests.

Though the management network through which the request for a new service or new connection travels has a significant bandwidth and therefore imposes only few constraints in terms of throughput, such is not the case for the transport network for which the load caused in terms of throughput is increasingly significant.

SUMMARY

An embodiment of the invention is directed to a method for transmitting a sequence of N identifier fields of a virtual network of a client entity to at least one server entity of a packet switching transport network.

According to an embodiment of the invention, the method implements, at the level of the client entity:
a step of choosing a coder from among a plurality of coders for coding a sequence formed by said plurality of virtual network identifier fields, according to a length criterion for the coded sequence,
a step of coding the sequence with the aid of the chosen coder intended to provide a coded sequence, representative of said sequence,
a step of transmitting the coded sequence and associated coding parameters in a control packet, said coding parameters comprising at least one identifier of the coder.

According to an embodiment of the invention, the method implements, at the level of each server entity, on receipt of a control packet:
a step of detecting and reading the coding parameters in the packet received, intended to detect at least said coder identifier,
a step of decoding the coded sequence received with the aid of a decoder corresponding to said coder identifier.

Thus, an embodiment of the invention proposes an entirely novel and inventive solution for transmitting a sequence of Ethernet VLAN identifier fields in a transport network. Specifically, the method according to an embodiment of the invention applies not only a data compression algorithm or coder to the sequence formed by the plurality of virtual network identifier fields so as to obtain a coded sequence of reduced length representative of said sequence, but it chooses, from among a list of available coders, that one which is suitable for providing the shortest coded sequence.

This coded sequence, on account of its reduced length, can thereafter be written into a single control packet.

An embodiment of the invention thus makes it possible to solve the technical problem of the more effective transmission of a plurality of Ethernet VLAN identifier fields in a transport network.

In a first embodiment of the invention, the step of choosing the coder consists in testing the plurality of coders and in choosing that which actually provides the shortest coded sequence. This is an exhaustive solution which gives the assurance of implementing the coding algorithm best suited to the sequence of identifier fields present.

In a second embodiment of the invention, the step of choosing the coder comprises the sub-steps:
of extracting a plurality of characteristics of the sequence of identifier fields; and
of applying said pre-established rules to these characteristics culminating in the choice of a coder.

Such rules determine the coder to be used as a function of intrinsic characteristics of the sequence to be coded, for example of the characteristics related to a statistic of the sequence to be coded. An advantage is that it is not necessary to test the plurality of coders each time that a sequence of identifier fields has to be dispatched. The resources at the level of the client entity responsible for implementing the method according to an embodiment of the invention are therefore spared.

According to an advantageous characteristic of an embodiment of the invention, the pre-established rules are established on the basis of a training set comprising a plurality of sequences. Such training, which requires significant calculation resources, is done in a prior step and makes it possible to establish very simple rules which will be easily implemented during the transmission of a real sequence.

According to another advantageous characteristic of the second embodiment of the invention, the method comprises a step of comparing the length of the sequence coded by the chosen coder with the length of the sequence S, in such a way that, if the length of the coded sequence is greater than the length of the sequence S, an additional step of coding the sequence S is implemented with the aid of a reference coder able to provide a coded reference sequence of shorter length than the length of the sequence S. An advantage is that one is thus assured of obtaining and thereafter of transmitting a coded sequence of shorter length than a given maximum length.

An embodiment of the invention also relates to a client entity able to transmit, on a transport network, to at least one server entity, a plurality of identifier fields of a virtual network. According to an embodiment of the invention, such an entity comprises:
means for choosing a coder from among a plurality of coders able to code a sequence comprising said plurality of identifier fields, according to a criterion of shorter length of the coded sequence,
means for coding the sequence of N identifier fields with the aid of the chosen coder, able to provide a coded sequence representative of the sequence,
means for transmitting the coded sequence and associated coding parameters in a control packet, said coding parameters comprising at least one identifier of the coder.

An embodiment of the invention also relates to a server entity of a transport network able to receive a control packet comprising a coded sequence representative of a sequence comprising a plurality of virtual network identifier fields.

According to an embodiment of the invention such a server entity comprises:
means for identifying coding parameters in the packet received, the coding parameters identified comprising at least one identifier of the coder used,
means for decoding the coded sequence received with the aid of a decoder corresponding to the coder identified on the basis of the identified coding parameters.

An embodiment of the invention also relates to a computer program product downloadable from a communication network and/or stored on a medium readable by a computer and/or executable by a microprocessor.

According to an embodiment of the invention, such a computer program product comprises program code instructions for executing the transmission method when it is executed on a computer.

An embodiment of the invention relates finally to a signal carrying a control packet emitted by a client entity on a transport network destined for a server entity.

According to an embodiment of the invention, such a control packet comprises a coded sequence representative of a plurality of virtual network identifier fields and associated coding parameters.

BRIEF DESCRIPTION OF THE DRAWINGS

Other advantages and characteristics will be more clearly apparent on reading the following description of a particular embodiment of the invention, given by way of simple illustrative and nonlimiting example, and the appended drawings, among which.

DETAILED DESCRIPTION OF ILLUSTRATIVE EMBODIMENTS

The general principle of an embodiment of the invention relies on the auto adaptive selection of a coder responsible for compressing a sequence formed by a plurality of Ethernet VLAN identifier fields with a view to its transmission in a single control packet on the transport network.

Figure 1:
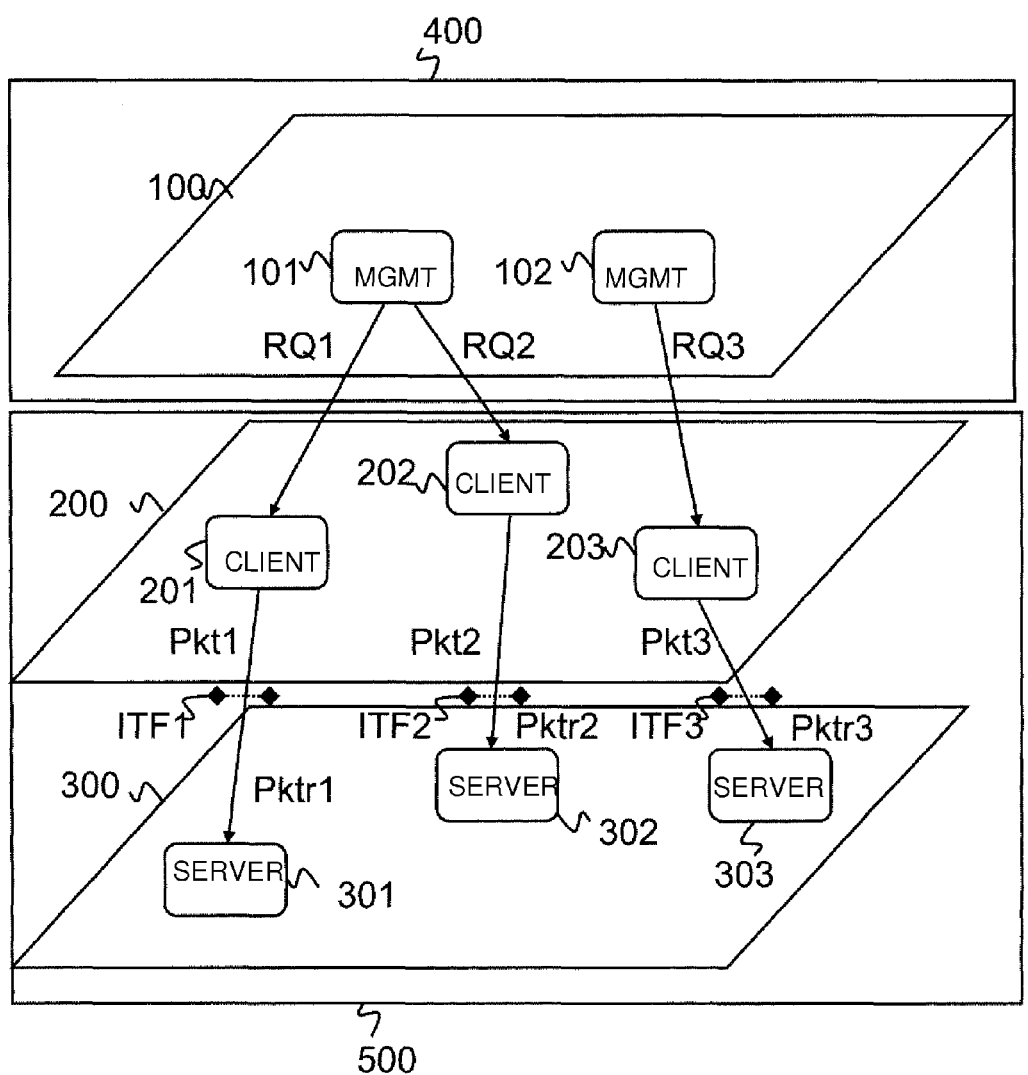
FIG. 1 represents an exemplary transport network implementing the method according to an embodiment of the invention.

An exemplary application of the method for transmitting a plurality of Ethernet VLAN identifier fields according to an embodiment of the invention is presented first of all, in conjunction with FIG. 1. A transport network 500 has been represented according to a management plane 100, comprising a first management entity 101 and a second management entity 102, a control plane 200 comprising a first client entity 201, a second client entity 202 and a third client entity 203, and a transmission plane 300 comprising a first server entity 301, a second server entity 302 and a third server entity 303. The client entities 201, 202, 203 communicate with the server entities 301, 302, 303 by way, respectively, of a first interface ITF1, of a second interface ITF2 and of a third interface ITF3 between the control plane 200 and the transmission plane 300. The client entity 201, 202, 203 has received from the management entities 101, 102 of the management plane 100 at least one request RQ1, RQ2, RQ3 for connection to a plurality of new services.

It is indicated that such a request RQ1, RQ2, RQ3 may relate either to a single identifier field or to the plurality of Ethernet VLAN identifier fields.

In response to this request RQ1, RQ2, RQ3, the client entity 201, 202, 203 communicates with the server entity 300 to 302 via the interface ITF1, ITF2, ITF3 of the control plane 200 so as to establish, in the transport network 500, at the level of the transmission plane 300, the connections demanded by putting in place the plurality of the new services requested.

In an advantageous manner, the request RQ1, RQ2, RQ3 comprises Ethernet level information and can be transmitted from the client entity 201, 202, 203 of the control plane to the server entity 301, 302, 303 of the transmission plane 300 in the form of a message emitted on the interface ITF1, ITF2, ITF3. In an advantageous manner, the interface ITF1, ITF2, ITF3 is of UNI type, the acronym standing for "User to Network Interface". In this case, the Ethernet VLAN identifier fields corresponding to the services requested are generally included in an object whose structure can vary according to the protocol used to transmit the message. In the case of the RSVP protocol, the acronym standing for "Resource Reservation Protocol", or LDP protocol, the acronym standing for "Label Distribution Protocol", it involves for example a TLV, the acronym standing for Type Length Value.

In this exemplary application, an Ethernet VLAN identifier field $V_N$ such as defined in the IEEE 802.1Q standard is considered. Such an Ethernet VLAN identifier field is a serial number whose possible values lie between 0 and $2^N-1$. According to such a standard, N is an integer equal to 12. The number of values that can be taken by the VLAN identifier field $V_N$ is $2^N=2^{12}=4096$ possible values.

It should be noted however that an embodiment of the present invention is not limited to such a standard, but that it also relates to any other identifier symbol of an Ethernet VLAN, for example the I-TAG field defined by the IEEE 802.1ah standard or else any label defined by a communication protocol such as MPLS, the acronym standing for "Multiprotocol Label Switching", or GMPLS, the acronym standing for "Generalized Multiprotocol Label Switching", currently undergoing normalization at the IETF, the acronym standing for "International Engineering Task Force".

A plurality of identifier fields comprising k identifier fields, k being an integer greater than or equal to 1, is now considered. This plurality of identifier fields has been received by the client entity 201, 202, 203 by way of the management network 400 in the form of at least one request RQ1, RQ2, RQ3. According to an embodiment of the invention, it is thereafter concatenated into a sequence S, which is transformed into a coded sequence Ci(S) which can thereafter be encapsulated in a message emitted on the interface ITF in the form of a single control packet Pkt1, Pkt2, Pkt3.

Figure 2:
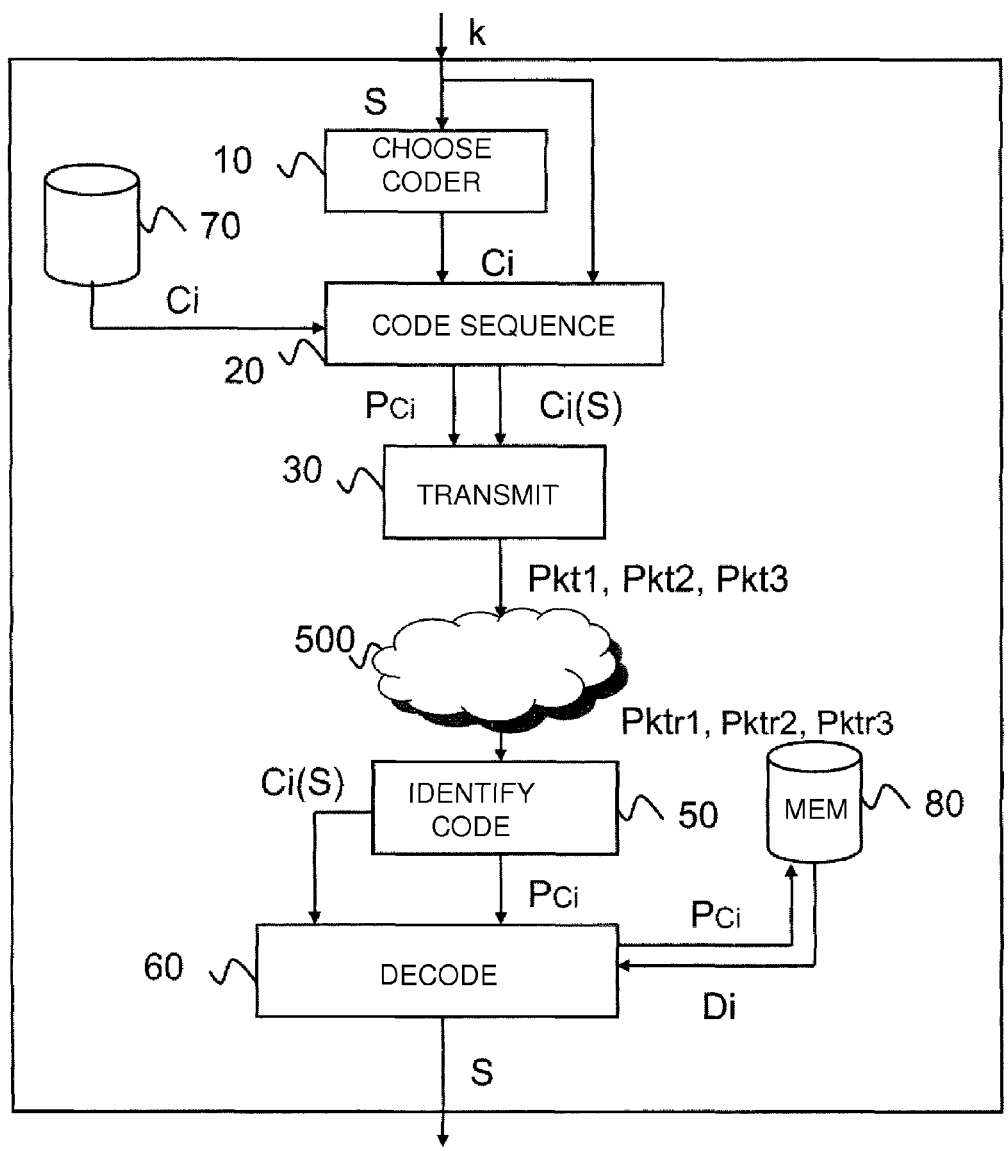
FIG. 2 represents, purely illustratively, a flowchart of the essential steps of implementing the method which is the subject of an embodiment of the present invention.

The essential steps of implementing the method according to an embodiment of the invention are now presented, in conjunction with FIG. 2.

Such a method comprises, at the level of the client entity 201, 202, 203:

a step 10 of choosing a coder Ci from among a plurality of coders C1 to CM, M being an integer greater than or equal to 2. The plurality of coders C1 to CM is for example stored in a memory 70 in the form of a plurality of software modules L1 to LM. In an advantageous manner, the coder is chosen in such a way that the coded sequence obtained satisfies a shorter length criterion, a step 20 of coding the sequence S with the aid of the chosen coder Ci and intended to provide a coded sequence Ci(S) representative of the sequence S. Coding parameters PCi are associated with the coder Ci. Such parameters comprise at least one identifier ID-Ci of the chosen coder Ci. They can furthermore comprise parameters initializing the coder P-ini, a step 30 of transmitting the coded sequence Ci(S) and associated coding parameters PCi in a control packet Pkt1 to Pkt3. The control packet Pkt1 to Pkt3 emitted by the client entity 201, 202, 203 is transmitted via the interface ITF1, ITF2, ITF3 to the corresponding server entity 301, 302, 303.

According to an embodiment of the invention, the method comprises, at the level of the server entities 301, 302, 303:

a step 50 of detecting and reading the coding parameters PCi in the control packet received Pktr1, Pktr2, Pktr3, intended to identify at least the coder used Ci, a step 60 of decoding the coded sequence received with the aid of a decoder Di corresponding to the identified coder. The plurality of decoders D1 to DM corresponding to the coders C1 to CM is for example stored in a memory 80 in the form of a plurality of software modules L'1 to L'M.

Figure 3A:
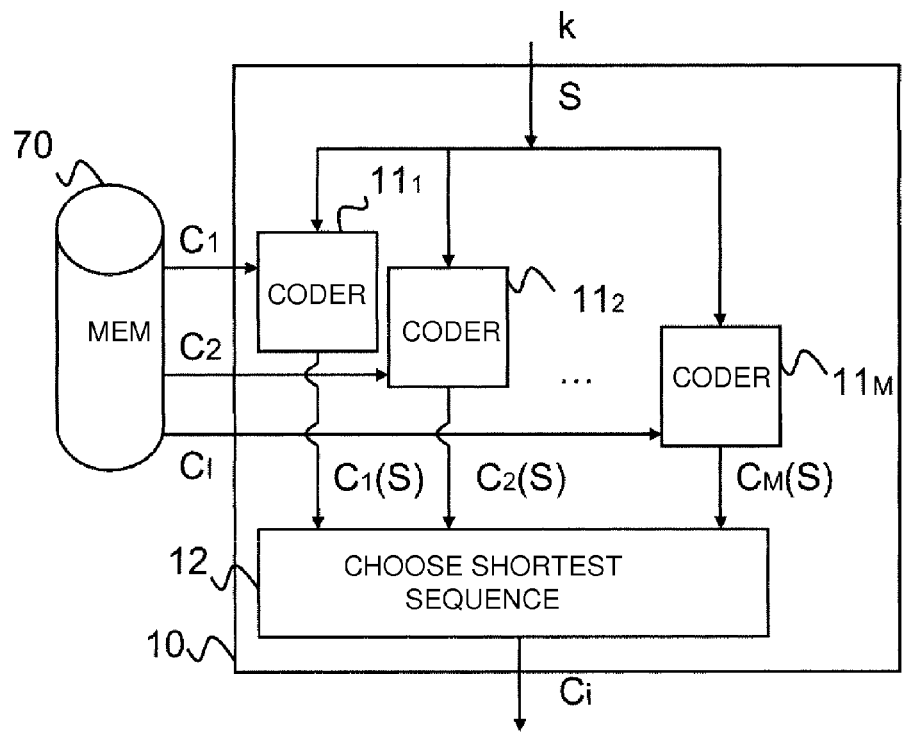
FIG. 3a represents, purely illustratively, a flowchart of the essential steps of implementing the method according to a first embodiment of the invention.

A first embodiment of the invention is considered, in conjunction with FIG. 3a, according to which step 10 comprises:

a plurality of steps $11_1$ to $11_k$ of implementing the plurality of coders $C_1$ to $C_M$, intended to provide a plurality of coded sequences $C_1(S)$ to $C_M(S)$, a step 12 of choosing the shortest coded sequence $C_i(S)$ from among the plurality of coded sequences $C_1(S)$ to $C_M(S)$.

This is an exhaustive procedure, which exhibits the advantage of definitely determining the most effective coder for a given sequence of VLAN identifier fields. The expression "most effective coder" is understood to imply that which satisfies the shortest length criterion for the coded sequence.

It is indicated that, according to an embodiment of the invention, the plurality of coders $C_1$ to $C_M$ implemented by the method is based on coding techniques well known to the person skilled in the art, which include, for example:

CI: the identity coder, which reproduces the input sequence identically at output, LI: the list coder, according to which the number of Ethernet VLAN serial numbers present in the sequence is represented by a first N-bit word, the following N-bit words representing, in list form, the serial numbers of the Ethernet VLAN identifier fields to be coded, MX: the mixed coder, according to which a first N-bit word represents a number a of isolated Ethernet VLAN serial numbers in the input sequence and a second N-bit word represents a number b of groups of Ethernet VLAN identifier field serial numbers, the following a N-bit words contain the isolated Ethernet VLAN identifier field serial numbers and the following b pairs of N-bit words contain the start-of-group and end-of-group serial numbers.

BI: a binary sequence of $2^N$ bits in which a 1 bit at rank i represents the presence of Ethernet VLAN identifier field serial number i in the input sequence S, H2: auto adaptive Huffman coder based on an alphabet of 4 symbols, i.e. a symbol length of 2 bits, applied to the sequence provided by BI, H4: auto adaptive Huffman coder based on an alphabet of 32 symbols, i.e. a symbol length of 4 bits, applied to the sequence provided by BI, H8: auto adaptive Huffman coder based on an alphabet of 256 symbols, i.e. a symbol length of 8 bits, applied to the sequence provided by BI, RLE: RLE coding with a symbol length equal to 1, applied to the sequence provided by BI.

Figure 3B:
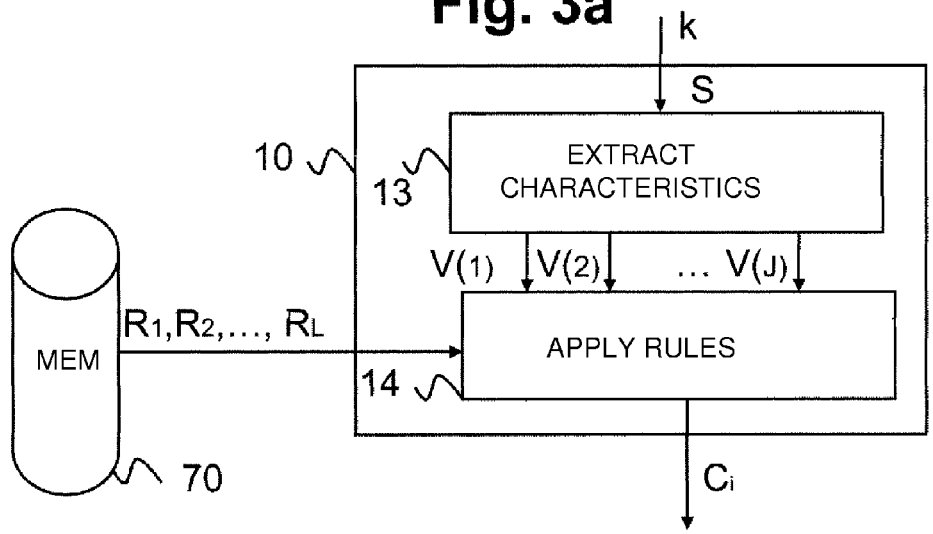
FIG. 3b represents, purely illustratively, a flowchart of the essential steps of implementing the method according to a second embodiment of the invention.

A second embodiment of the invention is then considered, in conjunction with FIG. 3b, according to which step 10 comprises:

a step 13 of extracting a plurality of characteristics V(1) to V(J) of the sequence of identifier fields, J being an integer greater than or equal to 1; and a step 14 of applying pre-established rules R1 to RL to these characteristics, L being an integer greater than or equal to 1.

It is indicated that the list of coders that are used is the same as in the first embodiment.

This is a heuristic procedure, which is now described in a detailed manner in an exemplary application. A sequence of Ethernet VLAN identifier field serial numbers in fact possesses intrinsic characteristics which can advantageously be utilized during its coding. Intrinsic characteristics such as these relate for example to a distribution of the k Ethernet VLAN identifier field serial numbers constituting the sequence from among the $2^N$ possible values. Step 13 according to an embodiment of the invention can then advantageously extract a vector of characteristics V comprising J components. In this example, the following J=5 characteristics are considered:

The total number of Ethernet VLAN identifier fields V(1) in the sequence S, a total number V(2) of groups of Ethernet VLAN identifier fields in the sequence S, a group of Ethernet VLAN identifier field serial numbers comprising at least two consecutive serial numbers, a number V(3) of isolated Ethernet VLAN identifier fields, an Ethernet VLAN serial number being isolated if the neighboring Ethernet VLAN identifier field serial numbers are not present in the sequence S, a number V(4) of groups of Ethernet VLAN identifier fields of size greater than 3 in the sequence S, a number V(5) of groups of Ethernet VLAN identifier fields of size greater than 10 in the sequence S.

The effectiveness of the previously defined coders depends on the intrinsic characteristics of the sequence S to be coded. For example, the identity coder CI is very effective for representing a sequence comprising a few isolated Ethernet VLAN identifier field serial numbers. The mixed coder MX is effective for representing a sequence comprising a few isolated Ethernet VLAN identifier field serial numbers and a few ranges of Ethernet VLAN identifier fields. The list coder LI is effective for representing a large number of Ethernet VLAN identifier fields. The H2, H4, H8 and RLE coders make it possible to compress the sequence provided by the BI coder.

According to the second embodiment of the invention, step 14 implements rules R1 to RL for deciding which coder is the most suitable as a function of a value of the vector V. In an advantageous manner of an embodiment of the invention, such rules are established on the basis of a test set comprising a plurality of sequences described by vectors V and the best associated coder. Diverse techniques, well known to the person skilled in the art, can be used. Among them may be mentioned the technique of neural networks. A neural network is capable, in a training phase, of constructing connections that it will then put into application for real vectors. Such training, which requires significant calculation resources, is done once and for all in a prior step.

An alternative to the neural technique is to deduce very simple heuristic rules from a large number of realistic simulations.

By way of example, a set of rules obtained on the basis of simulations carried out on sequences of VLAN serial numbers comprising 9 bits is presented below:

individual VLANs:
R1: V(1)=25: Ci=H4
R2: V(1)=50: Ci=H4,
R3: V(1)>100: Ci=H4,
Small groups of VLANs (10<V(2)>20)
R4: V(1)=25: Ci=H4,
R5: V(1)=50: Ci=H4,
R6: V(1)=100: CI=RLE,
R7: V(1)>100: CI=RLE
Large groups of VLANs (50<V(2)>100)
R8: Ci=RLE1,
Mixed
R9: 10 isolated+10 small groups: Ci=H4,
R10: 50 isolated+10 small groups: Ci=H4,
R11: 100 isolated+10 small groups: Ci=H4,
R12: 10, 50, 100 isolated+10 small groups: Ci=H4.

Tests performed on identifier fields $V_N$ of larger length have shown that the LI coder becomes very competitive.

This exemplary simulation also shows that a single coder does not make it possible to respond to all typical cases, thereby proving the benefit of the solution implemented by the method according to an embodiment of the invention of guaranteeing to transmit the shortest possible sequence of identifier fields.

According to an advantageous characteristic of the second embodiment of the invention, the method comprises a step of comparing the length of the sequence Ci(S) coded by the chosen coder Ci with the length of the input sequence S, namely $2^N$. If the length of the coded sequence is actually less than the length of the input sequence, then the transmission step 30 is implemented on the basis of the coded sequence Ci(S). If, conversely, the length of the coded sequence is greater than the length of the input sequence, then the transmission step 30 is implemented on the basis of a reference coder $C_R$ with which one is assured of obtaining a coded sequence $C_R(S)$ of size less than $2^N$. An advantage is that, in this way, a maximum size of the coded sequence transmitted in the control packet Pkt1, Pkt2, Pkt3 is guaranteed. The binary coder BI defined above will be taken, for example, as reference coder.

Figure 4A:
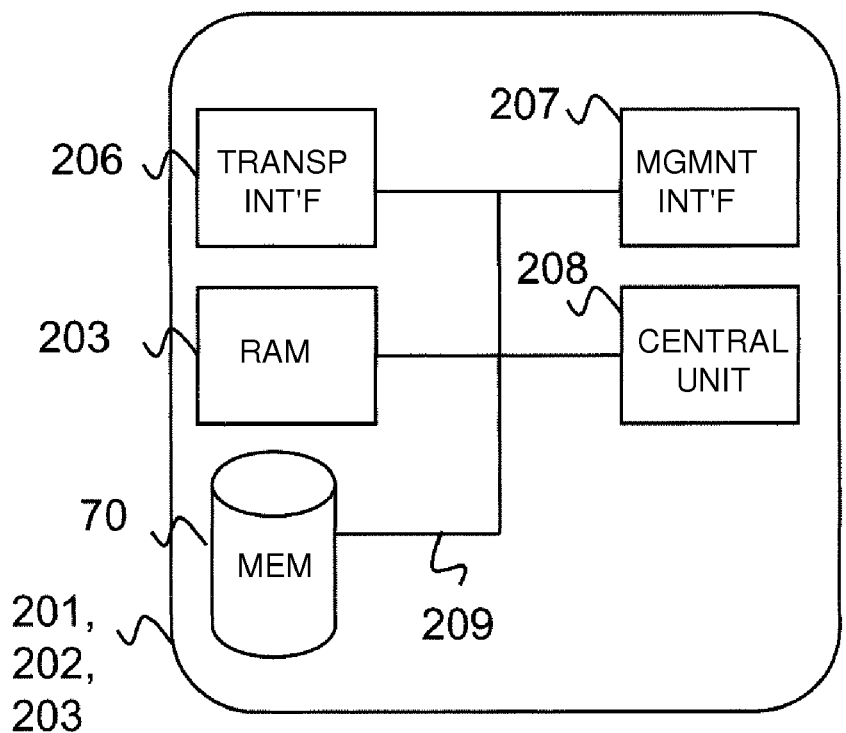
FIG. 4a represents, purely illustratively, a client entity which is the subject of an embodiment of the present invention.

A client entity according to an embodiment of the invention from among the previously mentioned client entities 200 to 202 is then presented, in conjunction with FIG. 4a. It is indicated that such an entity can advantageously be a router, an IEEE 802.1Q/D/ad/ah Ethernet switch or an MPLS or GMPLS type label switch.

The client entity 201, 202, 203 comprises a communication bus 209 to which are linked a central unit 208, a nonvolatile memory 70, a random-access memory 203, a transport plane interface 206 and a management plane interface 207. The nonvolatile memory 70 is adapted for storing the programs implementing an embodiment of the invention, such as the means for choosing a coder from among a plurality of coders, the means for coding the sequence of N identifier fields with the aid of the chosen coder and the means for writing the coded sequence and coding parameters into a packet. It comprises in particular the software modules L1 to LM corresponding to the plurality of coders C1 to CM. The nonvolatile memory 70 is for example a hard disk, a flash memory or a PROM, the acronym standing for "Programmable Read-Only Memory". More generally, the programs according to an embodiment of the present invention are stored in storage means. These storage means are readable by a computer or the central unit 208. These storage means are or are not integrated into the client entity 200 to 202 and may be removable. During power-up of the client entity 200 to 202, the programs are transferred into the random-access memory 203 which then contains the executable code of an embodiment of the invention as well as the data necessary for implementing the invention.

It should be noted however that such programs can also be installed in hardware components such as ASICs, the acronym standing for "Application Specific Integrated Circuits" or programmable logic components such as FPGAs, the acronym standing for "Field Programmable Gate Array".

The transport plane interface 206 allows the data exchanges between the client entity and the server entity so as to establish the physical connections on the transport network 500. This interface 206 is able to transfer or receive information in the form of Ethernet frames or SDH connections.

The management plane interface 207 allows the data exchanges with the management entity or NMS 101, 102 of the management plane 100. This interface 207 is able to transfer or receive information in the form of data packets, via the management network 400, through, for example, the SNMP protocol, the acronym standing for "Simple Network Management Protocol".

Figure 4B:
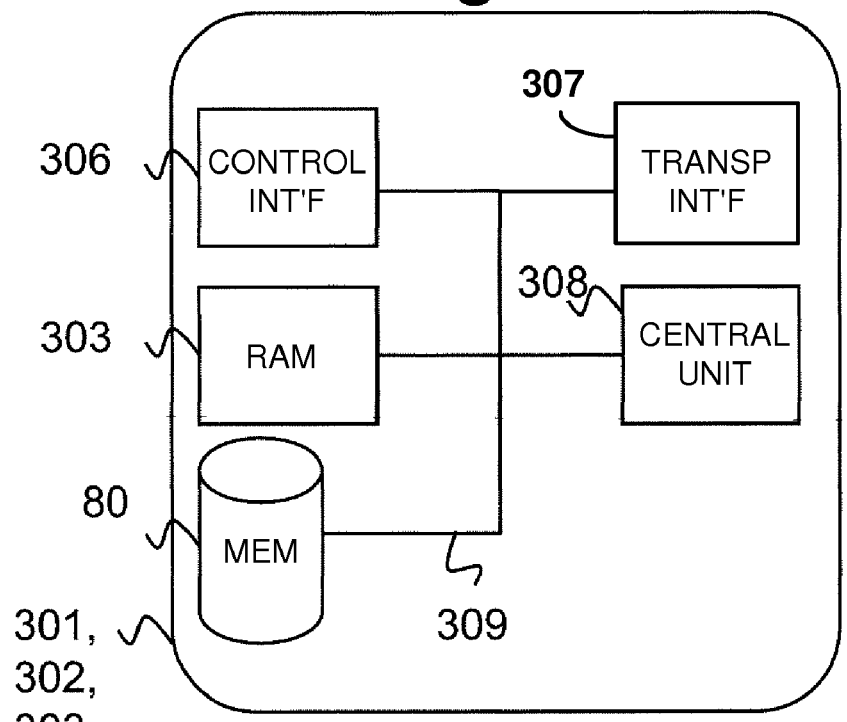
FIG. 4b represents, purely illustratively, a server entity which is the subject of an embodiment of the present invention.

Finally, a server entity from among the previously mentioned server entities 300 to 302 is presented, in conjunction with FIG. 4b. It is indicated that such a server entity can be a router, a switch, an optical cross-connect, a DSLAM or else an item of transmission equipment ADM, the acronym standing for "Add Drop Multiplexer". The server entity 300 comprises a communication bus 309 to which are linked a central unit 308, a nonvolatile memory 80, a random-access memory 303, a control plane interface 306 and a transport plane interface 307. The nonvolatile memory 80 is adapted for storing the programs implementing an embodiment of the invention, such as the means for identifying coding parameters in the packet received and the means for decoding the sequence of identifier fields received with the aid of a decoder corresponding to the identified coder. It comprises in particular the software modules L'1 to L'M corresponding to the plurality of decoders D1 to DM. The nonvolatile memory 80 is for example a hard disk, a flash memory or a PROM, the acronym standing for "Programmable Read-Only Memory".

More generally, the programs according to an embodiment of the present invention are stored in storage means. These storage means are readable by a computer or the central unit 308. These storage means are or are not integrated into the server entity 300 to 302 and may be removable. During power-up of the server entity 300 to 302, the programs are transferred into the random-access memory 303 which then contains the executable code of an embodiment of the invention as well as the data necessary for implementing an embodiment of the invention.

It should be noted however that such programs can also be installed in hardware components such as ASICs, the acronym standing for "Application Specific Integrated Circuits" or programmable logic components such as FPGAs, the acronym standing for "Field Programmable Gate Array".

The control plane interface 306 allows the data exchanges between the server entity 301, 302, 303 of the transport plane and the client entity of the control plane 201, 202, 203 so as to establish the physical connections on the transport network 500. This interface 306 is able to transfer or receive information in the form of Ethernet frames or SDH connections.

The transport plane interface 307 allows the data exchanges towards the telecommunication network 500. This interface 307 is able to transfer or receive information in the form of Ethernet frames.

An aspect of the disclosure thus provides a solution for transmitting a sequence of virtual network identifier fields between two entities of the transport network, in a manner which is more effective in terms of throughput.

Although the present disclosure has been described with reference to one or more examples, workers skilled in the art will recognize that changes may be made in form and detail without departing from the scope of the disclosure and/or the appended claims.

The invention claimed is:

1. A method for transmitting a plurality of virtual network identifier fields from a client entity to a server entity of a packet switching transport network, said method comprising:
  at the level of the client entity:
    a step of choosing a coder from among a plurality of coders for coding a sequence formed by said plurality of virtual network identifier fields as a coded sequence, according to a length criterion for said coded sequence,
    a step of coding the sequence with the aid of the chosen coder to provide said coded sequence, representative of said sequence,
    a step of transmitting the coded sequence of said plurality of virtual network identifier fields and associated coding parameters in a single control packet, said coding parameters comprising at least one identifier of the coder,
  at the level of the server entity, for a control packet received:
    a step of detecting and reading the coding parameters in the packet received, to identify at least the coder used, a step of decoding the coded sequence received with the aid of a decoder corresponding to the identified coder to produce said plurality of virtual network identifier fields.

2. The method as claimed in claim 1, in which said step of choosing the coder comprises:
a plurality of steps of implementing the plurality of coders, intended to provide a plurality of coded sequences,
a step of choosing the shortest coded sequence from among the plurality of coded sequences.

3. The method as claimed in claim 1, in which said step of choosing the coder comprises the steps:
of extracting a plurality of characteristics of the sequence of identifier fields; and
of applying pre-established rules to these characteristics, culminating in the choice of the coder.

4. The method as claimed in claim 3, in which the plurality of characteristics comprises a number of virtual network identifier fields in the sequence.

5. The method as claimed in claim 4, wherein the virtual network identifier field comprises a serial number, the plurality of characteristics comprises a first number of groups of virtual network identifier fields in the sequence, and a group of virtual network identifier fields is made up of at least one second number k of virtual network identifier fields exhibiting consecutive serial numbers, k being an integer greater than or equal to two.

6. The method as claimed in claim 3, wherein the plurality of characteristics comprises a number of isolated virtual network identifier fields in the sequence.

7. The method as claimed in claim 3, wherein said pre-established rules are established on a basis of a training set comprising a plurality of sequences.

8. The method as claimed in claim 3, wherein the method comprises a step of comparing the length of the sequence coded by the chosen coder with the length of the sequence, in such a way that, if the length of the coded sequence is greater than the length of the sequence, and wherein an additional step of coding the sequence is implemented with the aid of a reference coder able to provide a coded reference sequence of shorter length than the length of the sequence.

9. The method as claimed in claim 3, wherein the client entity transmits said sequence to the server entity in response to at least one request received from a management entity.

10. A client entity able to transmit, on a transport network, to at least one server entity, a plurality of virtual network identifier fields, wherein the client entity comprises:
means for choosing a coder from among a plurality of coders able to code a sequence comprising said plurality of identifier fields, according to a criterion of shorter length than the coded sequence,
means for coding the sequence of a plurality of virtual network identifier fields with the aid of the chosen coder to provide a coded sequence representative of the sequence,
means for transmitting the coded sequence of the plurality of virtual network identifier fields and associated coding parameters in a single control packet, said coding parameters comprising at least one identifier of the coder.

11. A server entity of a transport network, wherein the server entity comprises:
means for receiving a single control packet comprising a coded sequence representative of a sequence comprising a plurality of virtual network identifier fields;
means for identifying coding parameters in the packet received, the coding parameters identified comprising at least one identifier of the coder used,
means for decoding the coded sequence received with the aid of a decoder corresponding to the coder identified on the basis of the identified coding parameters to produce the plurality of virtual network identifier fields.

12. A non-transient computer readable medium comprising a computer program product stored thereon and comprising program code instructions for executing a method for transmitting a plurality of virtual network identifier fields from a client entity to a server entity of a packet switching transport network, when the instructions are executed on a computer, the method comprising:
at the level of the client entity:
a step of choosing a coder from among a plurality of coders for coding a sequence formed by said plurality of virtual network identifier fields as a coded sequence, according to a length criterion for said coded sequence,
a step of coding the sequence with the aid of the chosen coder to provide said coded sequence, representative of said sequence,
a step of transmitting the coded sequence of said plurality of virtual network identifier fields and associated coding parameters in a single control packet, said coding parameters comprising at least one identifier of the coder,
at the level of the server entity, for a control packet received:
a step of detecting and reading the coding parameters in the packet received, intended to identify at least the coder used,
a step of decoding the coded sequence received with the aid of a decoder corresponding to the identified coder to produce said plurality of virtual network identifier fields.

13. A signal carrying a control packet emitted by a client entity on a transport network destined for a server entity for implementing the method as claimed in claim 1, wherein the signal comprises a coded sequence representative of a plurality of virtual network identifier fields and associated coding parameters.

* * * * *